May 7, 1935.　　　　E. D. EBY　　　　2,000,747
FLUID STOP JOINT
Filed Nov. 6, 1934
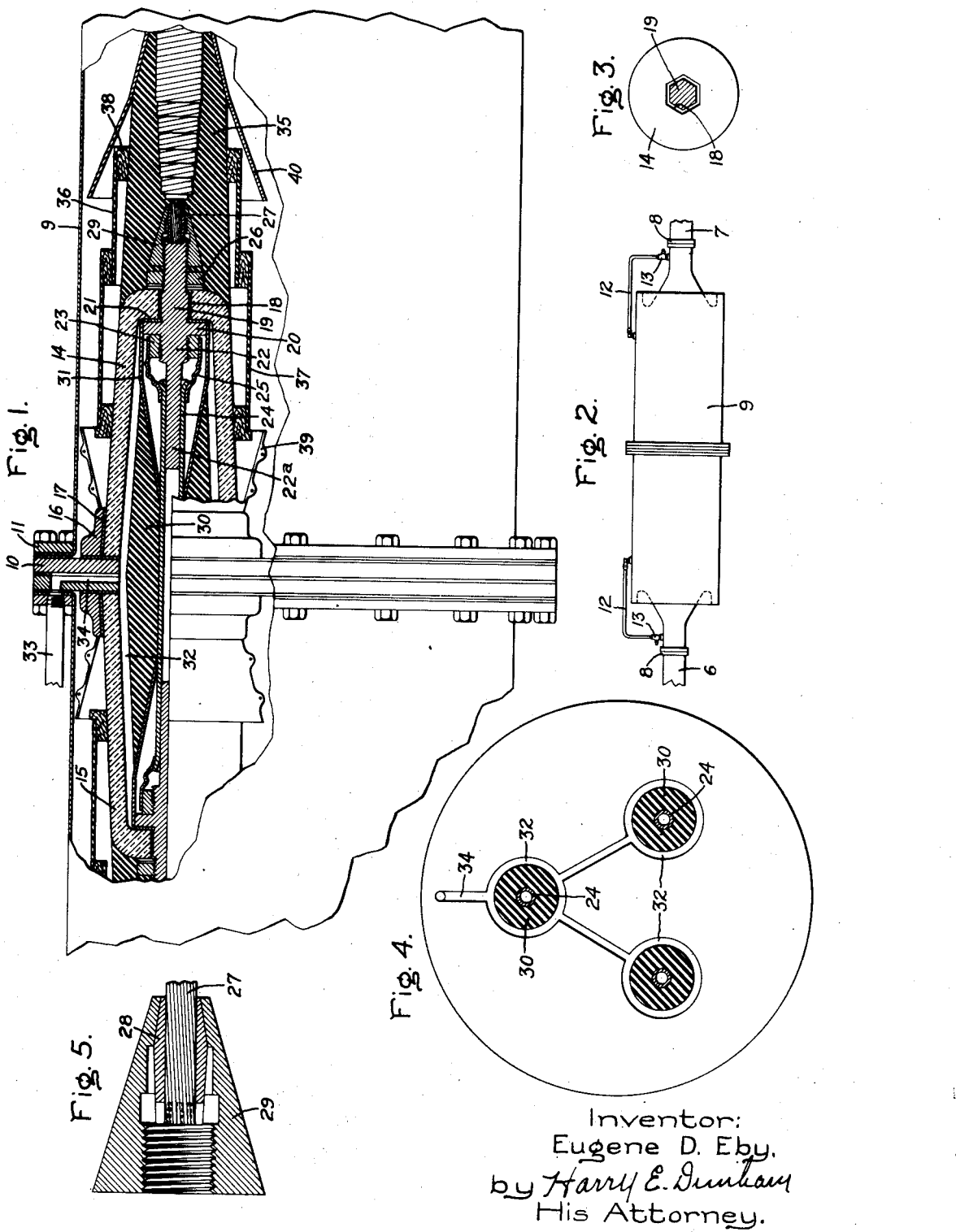
Inventor:
Eugene D. Eby,
by Harry E. Dunham
His Attorney.

Patented May 7, 1935

2,000,747

UNITED STATES PATENT OFFICE 2,000,747

FLUID STOP JOINT

Eugene D. Eby, Pittsfield, Mass., assignor to General Electric Company, a corporation of New York Application November 6, 1934, Serial No. 751,691

8 Claims. (Cl. 247—3)

The present invention relates to fluid stop joints for electric cables of the type involving high fluid pressures. Stated more specifically, it relates to that type of cable installation in which the cable is enclosed in a suitable pipe and in which the space within the pipe not occupied by the cable is filled with an insulating fluid under high pressure. The purpose of the high pressure fluid is to improve the dielectric strength of the insulation on the conductor or conductors of the cable. The utilization of high pressure fluid introduces problems which are not present in cable installations operating with low pressure fluids. The problem is especially acute in connection with the insulators in the stop joints which support the conductor or conductors and also prevent the passage of fluid from one side of the joint to the other. Porcelain is the material commonly used for insulators in stop joints on account of its high dielectric strength. It has the disadvantage of not being well adapted to withstand bursting strains but on the other hand is capable of withstanding high compression pressure.

My invention has for its object the provision of an improved stop-joint for cables especially those intended for use in systems operating under high fluid pressure. More specifically, my invention is directed to an arrangement of parts wherein the material of the insulators exposed to high fluid pressures is subjected to compression pressures as distinguished from being subjected to bursting pressures. Also to an arrangement of parts in a stop-joint whereby the walls of the insulators are subjected to differential fluid pressures to the end that the effective pressure thereon is reduced.

For a consideration of what I believe to be new and my invention, attention is directed to the accompanying description and the claims appended thereto.

In the accompanying drawing which is illustrative of my invention, Fig. 1 is a partial longitudinal section of a three-conductor fluid stop joint; Fig. 2 is a view of the joint in side elevation; Fig. 3 is a detail end view of an insulator; Fig. 4 is a face view of one of the plates forming the central partition, and Fig. 5 is a detail view of one of the cable clamps.

In Fig. 2, 6 and 7 indicate steel or other pipes in which the cable is located and which contain gas, oil, or other liquid insulation under high pressure. In the present case, the fluid insulation oil is under a pressure of the order of 300 pounds per square inch. This pressure may be due to the elevation of the remote end of the cable or it may be due to a pump or accumulator or both. The ends of the pipes have bolting flanges 8 which cooperate with similar flanges on the heads of the joint casing 9 to unite the parts. The casing is made in two principal parts, each having an outturned flange, said flanges being located on opposite sides of a partition 10, Fig. 1. Each flange is reinforced by a metal ring 11 and the flanges are held in firm contact with the partition by a series of clamping bolts. Gaskets are employed between the parts of the joints where necessary to ensure fluid tight joints. High pressure fluid from the pipe 6 enters the left hand side of the joint casing and similar fluid from the pipe 7 enters the right hand side of the casing. These pressures may be the same or different depending upon the character of the installation. When the ends of the casing have semi-stops or dams which may be used in making the joint between the conductors to prevent free escape of fluid from the pipes, by-passes 12 with suitable control valves 13 are or may be employed. When the valves are open, fluid from the pipes has free access to the interior of the casing. The by-passes may be connected one with the other when for any reason it is desired to render the stop joint ineffective.

Referring more especially to Fig. 1, the central partition is made in two parts for convenience in forming the necessary oil channels but it may be made of one piece if desired. The partition has as many through openings as there are conductors, in this case three.

It is necessary in a structure of this kind to permit current to flow from conductor to conductor and to prevent the passage of fluid between pipes 6 and 7. As each pair of conductors is similarly arranged, a description of one pair will suffice. Located on opposite sides of the partition are hollow porcelain or equivalent insulators 14 and 15 which are of tapered form with their large ends supported by the partition, there being suitable gaskets between their ends and the partition. Each insulator has a metal sealing ring 16 which is secured to the partition by suitable means such as bolts. Between the wall of the bore of the sealing ring and the insulator is a filling of lead or other jointing material 17. The outer end of the insulator is well rounded and contains a central opening 18 of hexagonal or other shape, as shown in Fig. 3, the purpose of which is to prevent relative angular motion between the insulator and the conductor passing therethrough when the clamping nuts are tightened.

Inside of the outer end of each insulator is a connector 19 having a body portion corresponding in shape to that of the opening in the insulator but making a free fit therewith. It is also provided with a flange 20 located inside of the insulator. Between the flange and the inner wall of the insulator is a gasket 21 to ensure a tight joint. The connector also has a screw-threaded portion 22 supporting a nut 23 and a rod-like portion 22a extending toward the partition 10. Surrounding the rod is a tube 24 making a sliding or telescopic fit therewith. Between the tube and nut are flexible connectors 25 which are soldered to both. The nut being adjustable permits of considerable axial adjustment but in some instances, it may be made an integral part of the connector. In the manufacture of porcelain it is very difficult and in some cases impossible to maintain exact lengths and it is on that account that the telescopic arrangement of the tube 24 and rod 22a is provided. The outer end of the connector is also screw threaded to receive the clamping nut 26. Between the nut and porcelain is a gasket to ensure a fluid-tight seal. Because porcelain is relatively brittle, it is important that it be not subjected to strains tending to crack it either during assembly or after the cable is in operation. By using separate connectors individually secured one to each of the insulators, no strain is imposed on the porcelain when the clamping nuts are seated. This has the further advantage that any failure of the end surfaces of the insulator to be exactly parallel with the partition 10 will not interfere with the proper seating and sealing of the connectors. Also, individual securing of the connectors permits of a slight mis-alignment of the insulators without danger of injury thereto. As previously stated, the rod 22a and tube 24 make a sliding connection and while they make a good fit, there is never the less a slight amount of play which will compensate for any small mis-alignment of the connector and insulators, such as might take place in the assembly. The flexible connectors 25 insure complete electrical continuity. Because the connector assembly or member is of metal and passes through the metal partition 10, it is necessary to insulate it. For this purpose, the tube 24 is utilized as a support for the insulating body as will appear later, and since the tube is supported at both ends, it serves to retain the body in a central position.

Each connector is united with the conductor 27 of each cable by means of a split sleeve 28, Fig. 5 having a tapered outer end, and a nut 29 which when screwed toward the center of the joint forces the wall of the sleeve into firm electrical contact with the conductor. The joint may also be soldered if desired.

The opposite half of the entire connector assembly is the same as that described above and hence needs no further description.

Surrounding the connecting tube 24 is a wrapping of insulation 30 which may be made of tape applied layer by layer with overlapping joints. The insulation is thickest in the center where the electrical stress is the highest and gradually decreases in thickness toward the ends of the insulator.

The insulating body is supported at its ends by a thin wall metal shield 31 which also covers the flexible connectors 25 and rests on the flange 20. Thus the shield serves two functions, i. e., it prevents concentration of electrical stresses at irregularly shaped parts inside of it and also forms a support for the end portions of the insulation.

Surrounding the insulation is a space or chamber 32 which is filled with oil or other liquid or a gas under pressure. The fluid in this chamber acts on the insulation tending to compress it and also on the inner walls of the two insulators. This pressure may be a relatively low one. Since both hollow or chambered insulators are subjected to high external pressures from the pipes 6 and 7 and to a lower internal pressure, it follows that the wall of each insulator is subjected to a differential pressure and that the more nearly these pressures balance, the less will be the effective load on the material of which the insulator is composed. It will be noted that the insulators are subjected externally to fluid pressures from different sources, i. e., pipes 6 and 7 which may be the same or different, depending upon operating conditions while internally both are subjected to one and the same pressure from a single source of supply. The latter may conveniently be maintained by a suitable reservoir designed to maintain the desired pressure.

Fluid is supplied to the chambers of both insulators by the supply pipe 33 and channels 34 formed in the left hand part of the partition. The particular arrangement of these channels is not material so long as they serve to supply fluid from the pipe 33 to all of the chambers. A simple arrangement is shown in Fig. 4 as an example.

It is intended that the partition, insulators and connector members shall be shipped from the factory as a unit and the unit is so constructed that it need not be taken apart by the jointer at the place of installation, thereby saving much labor and expense besides assuring a better job.

Prior to making the joints, the halves of the casing 9 are slipped back over the pipes 6 and 7. To enable this to be done, the heads of the casing which are secured to the pipes by flanged joints are separate from the cylindrical part of the casing and when assembled in final position they are united by welding or other means. The insulation on the conductor is reduced in thickness toward the conductor in a manner to form a series of steps. After the conductor end is bared of insulation and secured to the connector by the clamping nut, the parts are covered by a wrapped on body of tape insulation 35 which covers the parts from the end of the insulator 14 to the conductor insulation. This wrapping may advantageously correspond to that of standard practice. After this is done, cylindrical barriers 36 and 37 which were slipped over the conductor prior to making the joint are moved into place and held by suitable spacing blocks 38 of wood or other material. The clamping rings 16 of the insulators are provided with shields 39 for controlling electrical stresses. These are made in two parts of thin metal and united by screws. The taped insulation on the conductor ends have similar shields 40.

It will be seen by reason of the arrangement of the insulators that the high pressure fluid from the pipes 6 and 7 exerts compression on the walls thereof and that this is partly compensated by the internal fluid pressure supplied by the pipe 33. Also that the main parts of the joint can be made and assembled in the factory where complete facilities are afforded and shipped as a unit to the place of installation. Also that the telescopic arrangement of the tube 24 and connector rods will compensate for any difference in length of one or both insulators from a given standard. By using flexible connectors 25, good electrical conductivity is assured, and by using adjustable nuts on the parts 22 of the connectors suitable adjustments for any change in longitudinal dimensions may be made.

What I claim as new and desire to secure by Letters Patent of the United States is:

1. A fluid stop joint for cables comprising a pair of cables arranged end to end, enclosures for the cables each filled with a fluid under pressure, a joint casing connected at its ends to the enclosures, a transverse partition in the casing having an opening, a pair of chambered insulators mounted one on each side of the partition, each of said insulators being subjected to an external fluid pressure from one of the cable enclosures, a connector means extending through both insulators and also the opening in the partition for uniting the cables electrically, means securing the ends of the connector means to the insulators and forming fluid tight seats, and conduit means formed in the partition for introducing fluid under a positive pressure into the chambers of both insulators where, acting on the internal walls thereof, it serves to compensate in part for the pressures exerted by the fluids from the enclosures of the two cables.

2. A fluid stop joint for cables comprising a pair of cables arranged end to end, enclosures for the cables each filled with a fluid under pressure, a joint casing connected at its ends to the enclosures, a transverse partition in the casing having an opening, a pair of chambered insulators mounted one on each side of the partition, each of said insulators being subjected to an external fluid pressure from one of the cable enclosures, a connector secured to and passing through the outer end of each insulator, means uniting each connector with a cable conductor, a means capable of longitudinal adjustment for uniting the connectors and extending through the partition, and conduit means for introducing fluid into the chamber defined by the two insulators under positive pressure to compensate in part for the external pressure exerted on the insulators by the fluid from the two cables.

3. A fluid stop joint including as a part thereof a partition having an opening, a pair of hollow insulators permanently secured one to each side of the partition and extending outwardly therefrom, a connector extending through the outer end of each insulator and clamped thereto, means uniting the connectors electrically which includes an element that extends through the opening in the partition, a body of insulation surrounding the element and in spaced relation to the wall of the opening in the partition and the inner walls of the insulator, said body and the inner walls of the insulators defining a chamber which is common to both insulators, and a means in the partition for introducing fluid into the chamber.

4. A fluid stop joint including as a part thereof a partition having an opening, a pair of hollow insulators permanently secured one to each side of the partition and extending outwardly therefrom, a connector extending through the outer end of each insulator and clamped thereto, said connector having a screw threaded outer end and a rod-like inner end, a tube connecting the rod-like ends of the connector and in telescopic relation with one of said ends, a body of insulation surrounding the tube and in spaced relation to the wall of the opening in the partition and those of the insulators, and a channel in the partition for introducing fluid into the space between the walls of the insulators, partition and body of insulation.

5. A fluid stop joint including as a part thereof a partition having angularly displaced openings, a pair of hollow insulators surrounding each of the openings and secured to opposite sides of the partition, a connector member extending through each pair of insulators and secured thereto at its ends, a body of insulation for a portion of the length of each member which is in spaced relation to the partition and inner walls of the insulators and defining therewith a chamber common to each pair of insulators, and conduit means in the partition through which fluid is supplied to all of said chambers.

6. A fluid stop joint including as a unit thereof a partition having an opening, a pair of hollow insulators aligned with the opening and secured to opposite sides of the partition, a connector mounted in and extending through each insulator, an element connecting the opposed ends of the connector which includes a slip joint and flexible connectors, a shield engaging the element and covering the flexible connectors, a body of insulation on the element and supported at its ends by the shield, said body being in spaced relation to the wall of the opening and those of both insulators to form a chamber, and a conduit for filling the chamber with fluid.

7. A fluid stop joint including as a unit thereof a metal partition having an opening, a pair of chambered insulators aligned with the opening and secured to opposite sides of the partition, said chambers being in free communication, connectors individually secured to the outer ends of the insulators, a means electrically uniting the connectors and compensating for mis-alignment thereof, said means including a tube extending through the partition, shields supported by the tube and parts of the connectors, a body of insulation supported by the tube and the shields, and means for introducing fluid into the chambers of the insulators and submerging the body of insulation.

8. A fluid stop joint unit comprising a partition having an opening, a pair of hollow insulators aligned with the opening and secured to opposite sides of the partition, a connector mounted in and extending through each insulator, a tube mounted at its ends on the opposed ends of the connectors and in sliding engagement with one of them, said tube extending through the opening in the partition, shields extending between the tube and the connectors, one of said shields being in sliding engagement with one of the connectors, and a wrapping of insulation for the central portion of the tube which is supported at its ends by the shields.

EUGENE D. EBY.